Aug. 10, 1965   L. HANER ETAL   3,199,391
FLYING SHEAR CONTROL AND SHEET NUMBER AND LENGTH INDICATOR
Filed Dec. 26, 1963   4 Sheets-Sheet 1

INVENTORS
LAMBERT HANER
HUGH E. STEBNER
BY
Richard MacCutcheon
ATTORNEY

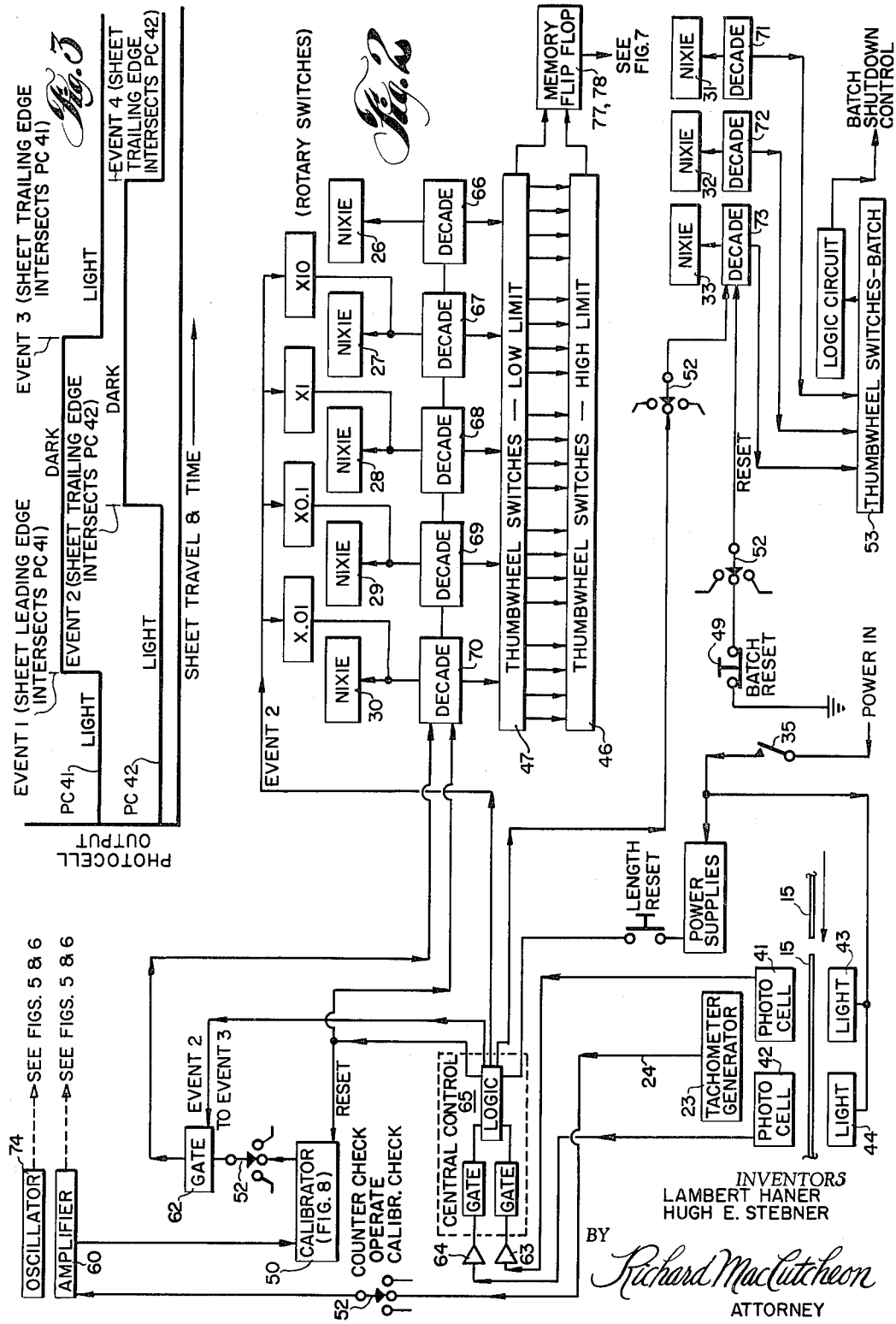

Aug. 10, 1965 L. HANER ETAL 3,199,391
FLYING SHEAR CONTROL AND SHEET NUMBER AND LENGTH INDICATOR
Filed Dec. 26, 1963 4 Sheets-Sheet 3

INVENTORS
LAMBERT HANER
HUGH E. STEBNER
BY Richard MacCutcheon
ATTORNEY

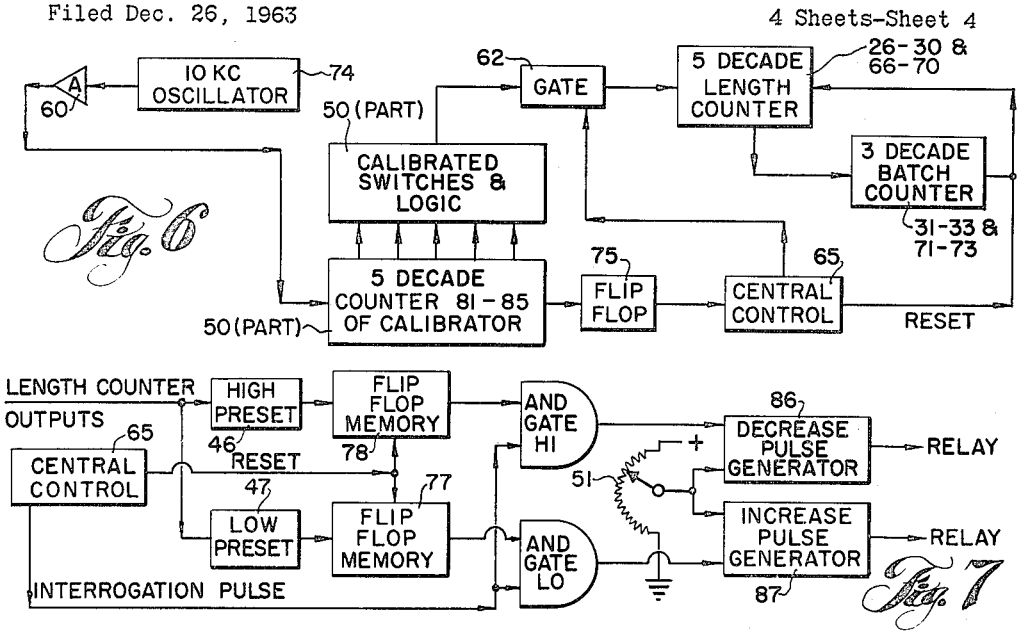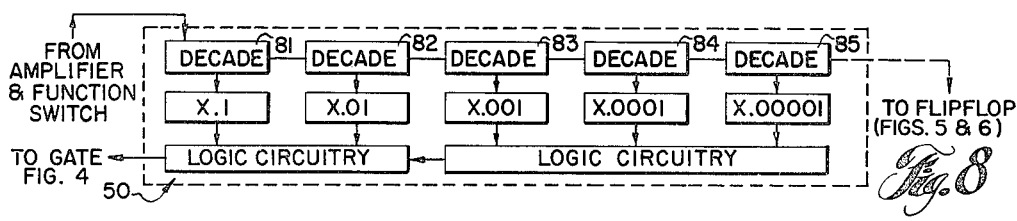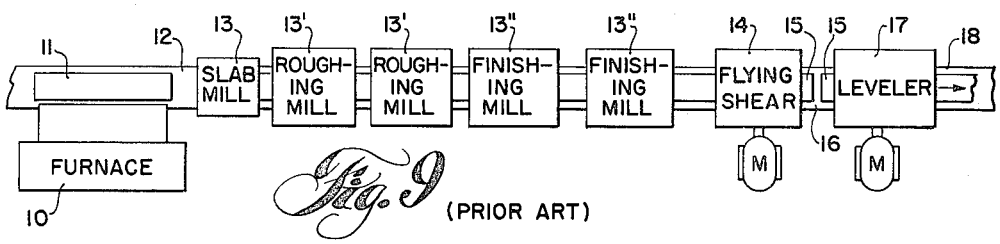

United States Patent Office 3,199,391
Patented Aug. 10, 1965

3,199,391
FLYING SHEAR CONTROL AND SHEET NUMBER
AND LENGTH INDICATOR
Lambert Haner, Rocky River, and Hugh E. Stebner,
Peninsula, Ohio, assignors to Avtron Manufacturing,
Inc., Cleveland, Ohio, a corporation of Ohio
Filed Dec. 26, 1963, Ser. No. 333,426
6 Claims. (Cl. 83—359)

The present invention relates to electrical control and/ or indicator systems and has particular significance in connection with the measurement, control and/or readout of length and batch number of sheets, of strip steel as delivered from a shear.

Ever since the 1930's the so-called "Flying Shear" has been known as a device which can cut fastly moving steel strip into a series of sheets. Heretofore there has been a problem in that the length of sheets so cut could not be precisely determined, or desired tolerances maintained, as a continuous strip advances, sometimes as fast as 30 miles an hour, while pile-up cannot be tolerated anywhere along the line and there is little possibility of shut down in order to make accurate measurements or adjustments.

It is an object of the present invention to provide simple and inexpensive means for overcoming the above mentioned difficulties.

Another object of the invention is to provide apparatus which will read out, for example in inches, the length of cut sheets as delivered by a flying shear, and then automatically take corrective action to control the shear to provide desired length for the predominance of the batch of such sheets, and which will have provision for calibration check of such apparatus when work material is not being cut.

Other objects and advantages will become apparent and the invention may be better understood from consideration of the following description taken in connection with the accompanying drawing, in which:

FIG. 2 is a schematic diagram of apparatus according to the invention;

FIG. 3 is a graph showing photocell output during operation;

FIG. 6 shows "Calibration Check" operation in block form;

FIG. 7 is a block diagram indicating how control output signals may be generated from the length measurement;

FIG. 8 is a schematic of a calibrator (block 61 in FIG. 2);

FIG. 9 shows a hot strip mill line having a flying shear; and

FIG. 10 shows a vertical elevation of a portion of the apparatus in FIG. 8.*

Figure 1:
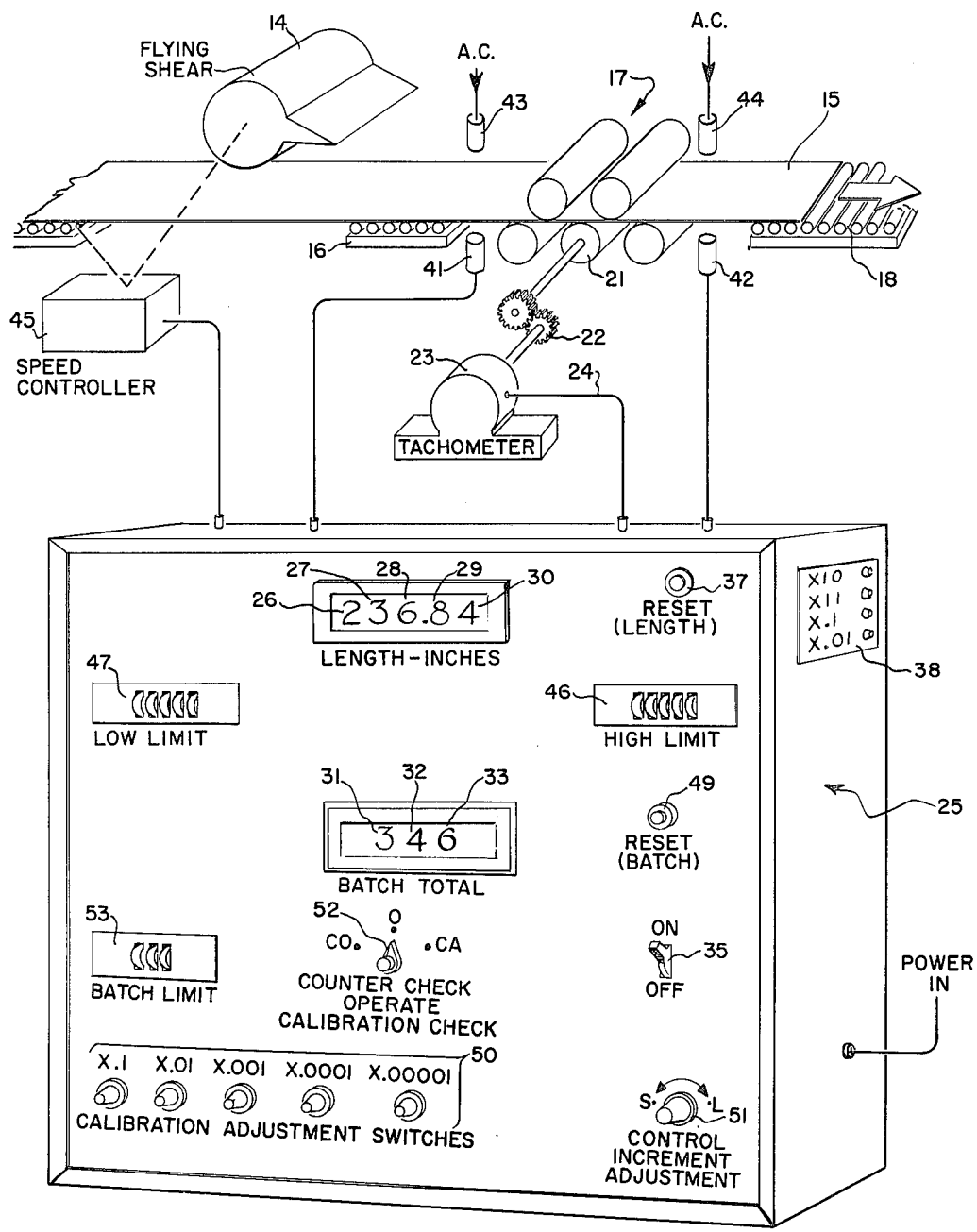
FIG. 1 is a part perspective schematic representation of a cabinet and associate apparatus system according to the invention.

FIGS. 9 and 10 might be called "prior art," and referring first to FIG. 9 a furnace 10 may deliver a slab 11 to a conveyor 12 leading to a slab mill 13 and roughing mills 13′ and finishing mills 13″ to deliver a 400 foot long strip more or less continuously to a flying shear 14, after which respective sheets 15 are moved by a conveyor 16 to pass through a leveler 17 and are collected by being caused to slide transversely off a final run-out table 18. According to the prior art a man had to deliberately pull a cut sheet off of the conveyor after the leveler and measure it with a tape measure (meanwhile imperfect sheets are flying out of the flying shear). Next the man would quickly run back to adjust a variable speed drive for the shear. But to do this accurately he would also have to calculate and take into account any change of speed of the strip that might have occurred since the test piece was cut.

The problem of using a limit switch or photocell to read sheet beginning to start a timer and permit a signal to be fed in (as from a tachometer to a computer until cutoff time) determined by operation of same switch or photocell when trailing end of cut sheet goes past, is complicated because the equipment speeds at various places are different. The conveyor 16 on the output side of the flying shear of necessity must run faster than the travel of strip through the shear, but this same conveyor, and the cut sheets 15 thereon (see FIG. 10), must run slower than the leveler 17 and the conveyor 18 at the output end of the leveler must of necessity run faster than the leveler.

According to one aspect of the present invention, many advantages are provided by using two photocells, one before a leveler to read passage of trailing end of each sheet, and one after the leveler to read the passage of beginning end of each sheet. The output of these photocells are fed into a computer into which is also fed length maximum and minimum tolerable limits and the output of the computer serves to display lengths of the cut sheets and automatically readjust the variable speed drive of the flying shear whenever such limits are exceeded so as to bring the next piece back within the desired tolerances.

Referring now to FIG. 1, in order to read the length of a cut sheet 15, and appropriately control the length of successively cut sheets 15, a leveler 17 (at which there is advantageously no slippage) has a roller 21 which through gearing 22 drives a tachometer (pulse generator) 23 which may be of P.M. excited type. This develops a signal, for example having a speed responsive frequency, which is taken through 24 to an equipment cabinet 25. It should be understood that in the drawing the various electrical connection lines schematically represent "signal flow" lines rather than any particular number of wires, and that plug-in connectors, e.g., both at tachometer and at equipment cabinet back, may be preferred although they are not shown.

The cabinet 25 contains, e.g., with modular plug-in circuitry for ease of replacement, preferably transistorized circuitry with wide angle nixie displays comprising five nixies (available from Burroughs Corporation) as indicated at 26–30 in FIGS. 1 and 2. The nixies serve to read out length of a cut piece of sheet, conveniently to .01 inch. Three more nixies, as indicated at 31–33, serve to display the total number of sheets cut since the last reset.

The cabinet is shown having an ON-OFF switch 35, and a reset button 37 which is used for manually resetting the TOTAL LENGTH-INCHES indicator (26–30) although in normal operation this indicator is reset automatically, as hereafter explained. At the back, or as shown at the side, a panel section 38 has four ten-point rotary switches (X10–X.01) which are used to "feed-in" the distance between a "front end" photocell 42 (encountered, in point of strip travel time, after the leveler 15) and a "trailing end" photocell 41 located before the leveler. The photocells are respectively illuminated as by lamps 43–44 (except when the sheet intervenes). Suitable drive means are provided for the leveler, and a variable speed drive means is provided for the flying shear and for the conveyor for work entering the shear, the speed of the shear 14 and of the strip entering it being varied together as by the speed controller indicated by the block 45 (FIG. 1).

A HIGH TOLERANCE LIMIT switch 46 is used to preset the maximum piece length permitted. This switch 46 is conveniently of the standard commercially available type having thumbwheels (for feeding-in settings) and adjoining each thumbwheel a transparency covered indicia wheel having ten digits (0–9) appearing according to setting of the particular wheel.

A similar thumbwheel switch 47 is used as a LOW TOLERANCE LIMIT to preset minimum piece length permitted before automatic corrective signals are applied.

A RESET 49 is useful for manually resetting the BATCH TOTAL indicator 31–33, and a calibrator (50 in FIGS. 2 and 8) comprises CALIBRATION ADJUSTMENT switches of rotary type which in the illustrated embodiment (FIGS. 1 and 8) are marked X.1 through X.00001. These switches are used with the calibration switches on panel 38 to calibrate the digital TOTAL LENGTH meter.

A "SHORT-LONG" CONTROL INCREMENT ADJUSTMENT potentiometer 51 (FIGS. 1 and 7) is used to adjust duration of pulse signals applied for correction of piece length, longer pulses providing greater length correction and shorter pulses providing less length correction.

A COUNTER CHECK–OPERATE–CALIBRATION CHECK switch 52, spring loaded to normally be centered on "Operate," allows self checking as hereafter explained, while a BATCH LIMIT comprises a switch 53 having thumbwheels used to preset total number of pieces desired in the batch. When this total is reached the shear line might be shut down by a resultant signal, or if it is not possible to stop the line, the shear alone might be stopped and the remaining strip sent on to a coiler apparatus.

Referring now to FIG. 2, like parts are like numbered as before. Pulse generator 23 provides pulses through the "Count Check"–"Operate"–"Calib. Check" selector 52 (when on "Operate") and a signal amplifier 60 to the calibrator 50.

Figure 4:
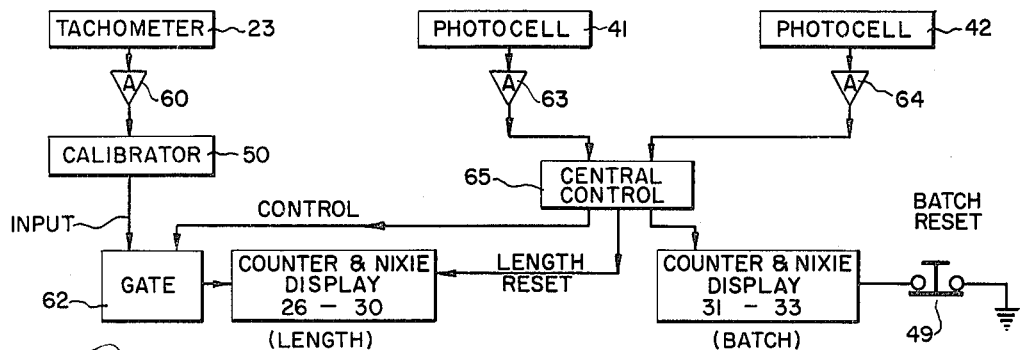
FIG. 4 is a simplified block diagram showing the length measurement and batch count, or "Operate" mode of operation, which is shown in FIG. 2.

As seen in FIG. 8, the calibrator 50 is shown including fine to coarse decades 81–85 (each of which runs up past 9 and then provides a signal to the next equipment in line, in well known fashion), and the rotary calibrator adjuster switches marked X.1 through X.00001, and logic circuitry, providing, as an output from the calibrator, a multiplication (though by a factor of less than 1) of the frequency of the output of the tachometer pulse generator 23 (of FIGS. 1, 2, and 4).

From calibrator 50 (see FIGS. 2 and 4) the multiplied pulse signal is taken as input for a GATE circuit 62. When the gate is opened, by a signal derived from the photocells 41, 42 feeding, as through amplifiers 63 and 64, and a central control 65, the pulse signal from calibrator 50 is taken to five fine to coarse decades 70–66, respectively associated with the length readout nixies 30–26 and (if control function is desired) with switches 46, 47.

From central control a signal is also taken to count sheets (for any particular batch) by means of fine to coarse decades 73, 72, 71 associated with batch nixies 33–31 and (if batch control is desired) switches 53.

Referring to FIG. 3 facilitates the understanding of photocell behavior and defines four critical events as the sheet progresses. Except when a sheet intervenes, the photocells are illuminated and in the "light" state. The "light" and "dark" states of the photocells are translated to corresponding electrical states, i.e., two discrete voltage levels, in the equipment.

As any given sheet progresses and its leading edge intersects the light beam of the first photocell 41 there occurs the "light" to "dark" transition and this for the sake of description is labeled Event #1 in FIG. 3. Continuing in progress from left to right in the diagram, Event #2 occurs when the leading edge intersects PC 42. Event #3 occurs when the trailing edge of the sheet crosses the light beam of PC 41, and Event #4 occurs when the trailing edge of the sheet crosses the light beam of PC 42. As is apparent, these events are time ordered.

As described for FIG. 1, the digital tachometer 23 being coupled directly to driven rolls (or to the drive motor) of the leveler assures that, during the time that a sheet is in process through the leveler, there is no slippage between the sheet and the leveler drive rolls and, therefore, each pulse delivered by this tachometer amplified as by the amplifier 60 (see FIG. 4) is indicative of an incremental distance of travel of the sheet through the leveler. In order to make the pulses delivered by the tachometer correspond to some standard measure unit of length such as, for example, inches or sixteenths of an inch or one-hundredths of an inch, etc., the digital calibrator 50 is inserted following the tachometer pulse amplifier 60. The digital calibrator multiplies the total pulses delivered by the tachometer (that is, the frequency of the pulses delivered by the tachometer) by a constant factor. This constant factor can be manually adjusted by means of the rotary switches located on the front panel. The multiplied pulses are fed to the length counter through standard gate circuitry 62 which is controlled by central control (see block 65) in response to signals delivered by the photocell units. Referring to FIGS. 3 and 4 (and 2 and 3), the operation of length measurement and batch count is as follows:

(1) Prior to Event #1, gate 62 is closed and counter 26–30 is displaying the previous length measurement.

(2) With Event #1 gate 62 is still closed and counter 26–30 displays previous measurement.

(3) Upon the happening of Event #2 both photocells are dark and central control opens the gate 62 and at the same instant resets the counter 26–30.

(4) When Event #3 occurs, PC 41 is "light" and PC 42 "dark." The central control 65 closes the gate 62 (to provide a readout of length) and simultaneously delivers a single pulse to a batch counter 31–33 to register another sheet measured.

(5) The length counter 26–30 continues to display the measurement until the next Event #2 occurs for the following sheet. Thus it is apparent that the length counter 70–66 was accumulating pulses between Events #2 and #3. The total number of pulses counted is equal to the length of the sheet minus the distance between PC 41 and PC 42. To make the counter display correctly, the associate decades of the counter are reset to a number equal to the distance between PC 41 and PC 42 rather than being reset to zero, and in the illustrated embodiment this is done by the rotary switches X.01–X10.

Figure 5:
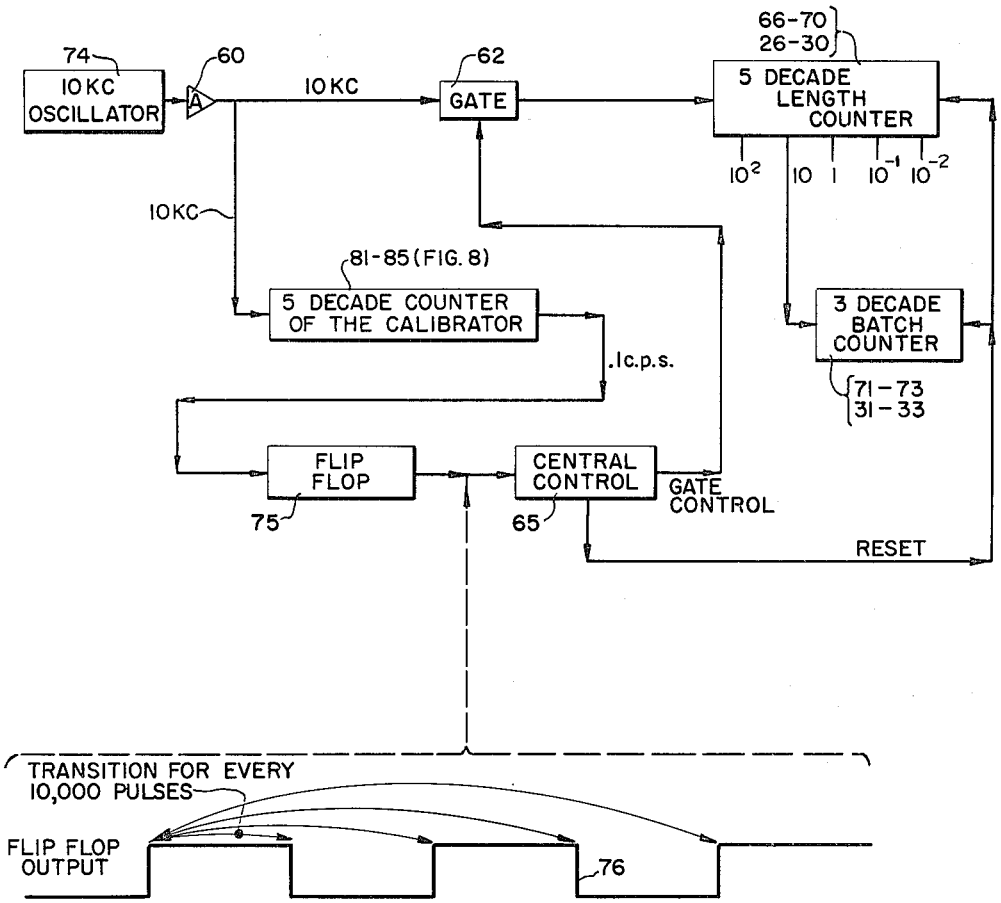
FIG. 5 is a block diagram showing "Counter Check" operation.

For the "counter check" mode of operation signal paths are switched such that a configuration as shown in FIG. 5 exists. An oscillator 74, producing pulses with a frequency of, for example, 10 kc., is fed into the input of the tachometer amplifier 60 in place of the tachometer signal. The amplifier output then feeds the gate 62 signal input directly and also feeds the five decade counter 81–85 of the calibration circuit 50. The output of the last decade of the calibrator has a frequency of 0.1 c.p.s. and this signal is fed into a flip-flop circuit 75 which thereupon undergoes a transition in state, e.g., once every 10 seconds, with a square wave output 76 as shown. This square wave is fed into the central control circuit 65 in place of the photocell inputs. The circuit is so arranged that the gate control signal now operates the gate 62 to the open and closed conditions in accordance with the square wave. Therefore, the operation is as follows:

(1) Gate opens and counters are reset simultaneously.
(2) Counter accumulates pulses until gate closes.
(3) Counter displays until gate opens again.

Since the gate is controlled in the open condition for a period equal to 100,000 pulses from the oscillator then the length counter will count from 00000 through to 00000 and display all zeros. If any of the counters are not functioning properly, then the display will not be 00000. The batch counter is connected to the output of the second stage of the length counter and therefore counts in parallel with three decades of the length counter.

Referring next to FIG. 6, for the "calibration check" mode of operation the system operation is the same as that described for the counter check with one exception. The input to the gate is now fed by the calibrator output and as a result the count displayed in the length counter is numerically identical to the switch settings of the calibrator. An error or malfunction is detected by the operator when the displayed count does not compare to the calibrator setting.

FIG. 7 contains a simplified diagram showing a preferred method by which control output signals are generated from the length measurement. Length counter outputs feed into the high and low preset circuits 46 and 47, respectively. Reset and interrogation pulses are generated by the central control circuit 65. For purposes of illustration, assume that a measurement is in process for a sheet the length of which will fall within the tolerance limits set by the high preset and the low preset. This being the case, then a pulse will be generated by the low preset circuit and will set the corresponding memory flip-flop 77 before Event #3 occurs. When Event #3 occurs an interrogation pulse is generated by the central control circuit and fed into two "and" gates designated Hi and Lo. The conditions are such that if the low preset memory circuit has been set, that is, if it received a pulse during the last completed measurement, then the Lo gate is closed and the interrogation pulse does not pass through. Also, if the high preset memory (78) has not been set the Hi gate is closed and the interrogation pulse does not pass through. Consequently, no control action is activated. If either the high preset memory has been set or the low preset memory has not been set, then the corresponding gate is open and the interrogation pulse will pass through. The outputs of Gate Hi and Gate Lo feed into separate pulse generators 86, 87 (which could be monostable multivibrators) to provide separate outputs which might, for example, drive relays to provide contact closures for use in control of the shear.

There is thus provided a device of the character described capable of meeting the objects above set forth, and based in part upon the fact that we have found, and it is a part of our invention, that it is not enough to use just one photocell and have the count start when the leading edge of the sheet of interest passes under it and have the count stop when the trailing edge of the sheet is viewed by the same photocell. This is so because of the various speed relationships, because slippage (between work material 15 and any conveyor belt) is an indeterminate, so that a single photocell's response cannot be accurately correlated with conveyor drive speed nor with drive speed of a leveler. But use of two photocells, as described, will assure that during the entire counting period the sheet of interest is engaged by and driven by the leveler. Since there is no, or at most negligible, slip between the leveler and the sheet, an accurate measurement is insured independent of line speed.

While we have illustrated and described particular embodiments, various modifications may obviously be made without departing from the true spirit and scope of the invention which we intend to have defined only by the accompanying claims taken with all reasonable equivalents.

We claim:

1. In electrical apparatus useful for readout and control of a flying shear used to provide leading and trailing edges of moving work material in a process line having at least one rotative device which in point of time is encountered by material after it has left the shear and which device is characterized by negligible slippage between itself and the sample material,
   the combination of
   a first transducer means for oppositely signalling passing of leading and trailing edges of work material and which means are located in point of work material travel time ahead of said rotative device,
   a second transducer means for oppositely signalling passing of leading and trailing edge of sample material and which second means are located in point of work material travel time after said rotative device,
   a source of pulses whose frequency is determined by the speed of said rotative device,
   and means for gating said pulses in a through the gate sense from the time when the second transducer means indicates passage of a leading edge to the time when the first transducer means indicates passage of a trailing edge of said work material.

2. In electrical apparatus for length measurement of sheet material as delivered from a shear operating on extended length strip material, the novel combination of
   a tachometer source of pulses associated with travel of sheet material,
   a calibrator means energized responsive to said source of pulses and for delivering a signal whose frequency is less than that of the tachometer pulses according to a predetermined manually adjustable ratio, said calibrator means including a decade counter, and also including manually adjustable ratio selecting switches,
   a gate circuit whose input is derived from said calibrator means,
   means for indicating passage of leading and trailing edges of said sheet material for controlling said gate circuit,
   and readout means connected to be energized from said gate and for indicating sheet length.

3. In electrical apparatus for length measurement and batch count of sheet material as delivered from a shear operating on extended length strip material, the novel combination of
   a tachometer source of pulses associated with travel of sheet material,
   a calibrator means energized responsive to said source of pulses and for delivering a signal whose frequency is less than that of the tachometer pulses according to a predetermined manually adjustable ratio, said calibrator means including a decade counter, and also including manually adjustable ratio selecting switches,
   a gate circuit whose input is derived from said calibrator means,
   means for indicating passage of leading and trailing edges of said sheet material for controlling said gate circuit,
   readout means connected to be energized from said gate and for indicating sheet length,
   and readout means for indicating number of sheets of batch, said last mentioned readout means being connected to be energized from said means for indicating passage of edges.

4. Apparatus as in claim 2 further characterized by switching means (52) for converting the apparatus to various ones of plural modes of operation one of which modes provides a measurement mode circuit (FIG. 4) with the apparatus arranged as in claim 2 and another of which modes provides a counter check mode circuit (FIG. 5) having
   an oscillator means (74) for supplying a reference frequency,
   means including connections from the output of said oscillator for simultaneously supplying the decade counter (81-85) of the calibrator (50) and said gate (62), a device (75) which has two stable states and which is connected to be actuated by said calibrator counter and to provide the control for said gate, and means including connections from the output of said gate to said readout means (66–70; 26–30) for indicating length.

5. Apparatus as in claim 4 further characterized by a third mode circuit which comprises a rearrangement by the switching means (52) of the input to the gate (62) to make the same responsive to the oscillator through both the counter of the calibrator (50) and the ratio selecting switches thereof, whereby to provide a calibration check.

6. Apparatus as in claim 2 further characterized by means for producing a signal indicating a cut sheet is less than a predetermined length and thereby controlling the shear as to subsequent sheets, and means for producing a signal indicating a cut sheet is more than a predetermined length and thereby controlling the shear as to subsequent sheets.

No references cited.

WILLIAM W. DYER, JR., *Primary Examiner.*